Nov. 13, 1962 P. FREEN 3,064,195

SIGNAL DISTRIBUTION SYSTEM

Filed May 5, 1960 2 Sheets-Sheet 1 amplification controlled by signal level at most remote point of system.

INVENTOR.
PHILIP FREEN
BY Amster & Levy
ATTORNEYS

SIGNAL DISTRIBUTION SYSTEM

Filed May 5, 1960 2 Sheets-Sheet 2

INVENTOR.
PHILIP FREEN
BY
Amster & Levy
ATTORNEYS

United States Patent Office 3,064,195 Patented Nov. 13, 1962

3,064,195

SIGNAL DISTRIBUTION SYSTEM

Philip Freen, Willowdale, Ontario, Canada, assignor to Benco Television Associates Ltd., Rexdale, Ontario, Canada, a corporation of Canada Filed May 5, 1960, Ser. No. 27,180
12 Claims. (Cl. 325—308)

This invention relates to signal distribution systems, and more particularly to means for distributing a received radio signal to a large number of subscribers over a wide area.

Broadcast signals in the very high frequency (VHF) and ultra high frequency (UHF) bands, such as television and FM, require line-of-sight transmission from broadcasting station to receiver to insure adequate reception. Variations in terrain as well as man-made structures often interfere with reception at locations within their shadow zones. To remedy this situation, the antenna of each receiver may be placed at the topmost point of the obstruction or on the side facing the broadcasting station and the received signal conducted via coaxial cables or the like to the receiver proper. Amplification may be required to provide a usable signal level if the distance between antenna and receiver is large.

A similar problem exists with respect to reception in fringe areas, where the available signal levels may be too weak and distorted to provide adequate reception, even with additional amplification. A solution may be found by placing the antenna closer to the transmitter where reception is good and conducting the signal back to the receiver proper over suitable transmission lines. Such an arrangement would almost certainly require amplification in the connection between the antenna and receiver.

In areas where entire communities are located in fringe areas or shadow zones, it becomes economically and technically impractical to provide a separate antenna and cable for each receiver. Instead, systems are provided consisting of a single antenna or antenna array feeding a main cable from which taps to the individual subscribers are taken. As can be readily appreciated, substantial amplification will be required as cable lengths and numbers of subscribers increase. This in turn presents problems of interference, distortion and the all-important problem of providing adequate signal level at each receiver regardless of the number of subscribers. The present invention provides a signal distribution system which overcomes these difficulties.

Accordingly, it is the primary object of this invention to provide an improved signal distribution system particularly suitable for use at VHF and UHF.

Another object is to provide a signal distribution system capable of servicing a large number of subscribers over a wide area with a minimum of distortion and interference.

A further object of this invention is to provide a signal distributing system providing amplification to insure adequate signal levels at all points in the system and wherein the amplification is controlled by the signal level at the most remote point of the system.

Still another object of this invention is to provide a signal distributing system including a plurality of amplifiers to insure adequate signal levels at all points in the system, the power supply for all of the amplifiers being generated at a single location in the system.

Yet another object of the invention is to provide such a signal distribution system wherein the power supply is controlled by the attenuation of the signal levels in the system, in turn controlling the amount of amplification provided.

A still further object of this invention is to provide a signal distribution system wherein power supply and signal voltages are transmitted over the same conductors.

Another object of this invention is to provide a novel amplitude and frequency stabilized oscillator particularly useful for generating a control signal in a signal distribution system.

Still another object of this invention is to provide a novel amplifier having its gain variable with supply voltage, particularly useful in a signal distribution system having an automatic gain control.

In accordance with the present invention, a distribution system is provided comprising an antenna arrangement supplying received signals to a coaxial cable or other suitable transmission line. Amplifiers are inserted in the transmission line at spaced intervals and taps are located wherever desired along the line to divert signal energy to the individual subscribers. A single power supply for all of the amplifiers used in the system is located at the end of the main transmission line remote from the antenna. As will become more apparent hereinafter, the single power source eliminates the requirement of a separate power supply at each amplifier, with the resultant economy and simplicity of installation.

To control the amount of amplification provided in the system and to insure that all subscribers have adequate signal level, a control or pilot signal is introduced at the antenna end of the system. This pilot signal is passed along the transmission line and through each of the amplifiers together with the received signals and thus is subject to the same attenuation. At the remote or power supply terminal of the system, the pilot signal is filtered out and its amplitude used to control the output level of the power supply. Each of the amplifiers in the system has a gain characteristic dependent upon the supply voltages and thus the amount of amplification through the system is controlled by the power supply. Variation of the power supply in response to the pilot signal thus provides a system automatic gain control which insures an adequate signal level at even the most remote subscriber point and under all reception conditions.

In a preferred embodiment of the system, the amplifiers, pilot signal generator and power supply utilize transistors and other semiconductor elements as their active components. The low supply voltage requirements of these devices enables power supply voltages to be distributed over the same conductors of the transmission line used for signal distribution. This factor, coupled with the small size and reliability of transistor devices, provides a system having heretofore unattainable economic and operating advantages.

The above and other features, objects and advantages will become apparent from the following more detailed description of a preferred embodiment of the invention, when read in conjunction with the accompanying drawings, in which.

Figure 1:
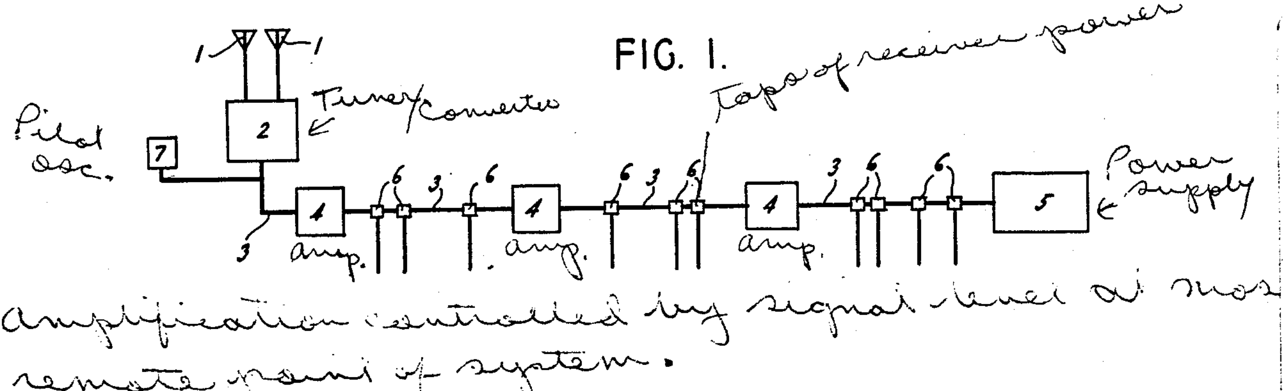
FIG. 1 is a block diagram of the signal distribution system according to the invention.

Referring now to the block representation of the system shown in FIG. 1, the elements 1 are antennas forming a suitable array for receiving signals transmitted from a remote point or points. The antennas are controlled and preferably tuned by means 2, which, if desired, may also contain a frequency converter for reception of UHF signals. It will be appreciated that the elements 1 and 2 may be of any suitable form and the particular details thereof are not of importance to the understanding of the present invention. The signal energy received by the antenna system is supplied to the transmission line 3, which in the preferred embodiment is a coaxial cable, although other types may be used. Spaced along the coaxial cable are amplifiers 4, each of which receives the signal from the cable and relays an amplified version thereof to the succeeding amplifier stage. Only three such amplifiers are shown but it will be readily appreciated that any number may be provided dependent upon the length of coaxial cable used.

At the terminal of the cable most remote from the antenna system is the power supply 5 from which are drawn all of the operating voltages required in the system. At various points along the coaxial cable, taps 6 are provided for supplying signal energy to receiving sets of individual subscribers. These taps may take the form of impedance matching pads which will introduce a minimum of attenuation and reflections in the line.

At the input or antenna end of the system is an oscillator 7 which provides a constant frequency, constant amplitude pilot signal to the coaxial cable 3. This signal is chosen to be of a frequency approximately mid-range of the band of frequencies to be transmitted over the system and is propagated therewith along the cable. This frequency is, of course, selected so as not to interfere with any of the received signals available to the subcriber.

As will be apparent from consideration of the system, the pilot signal from oscillator 7 will be subjected to the same attenuation as the signals received at the antenna 1. Since the pilot signal can be accurately controlled in amplitude, its magnitude at the most remote point of the system will give a true indication of the amount of attenuation introduced by the system components on the received signals. The difference of this indication from a predetermined value which will insure adequate signal level for all subscribers is used as a measure for controlling the gain of each of the amplifiers in the system so that the signal level at the remote end is maintained constant. This control is effected by varying the output voltage level of the power supply 5 in response to the level of the pilot signal. The gain of the amplifiers 4 varies in accordance with their supply voltages and is arranged to increase as the attenuation of the system increases, thus maintaining the signal level at each point in the system substantially constant.

Figure 2:
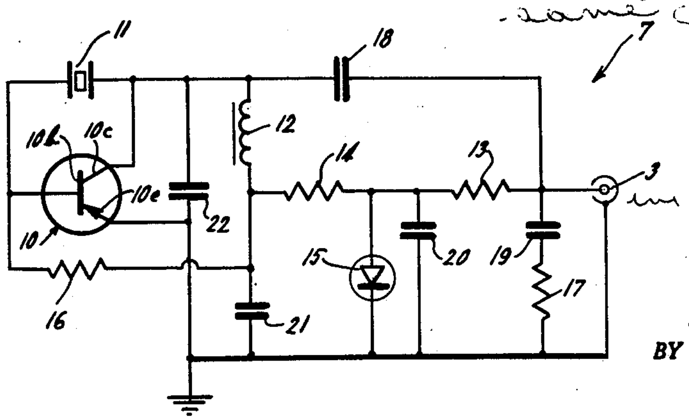
FIG. 2 is a schematic diagram of a preferred form of pilot signal oscillator used in the system.

A preferred form of the oscillator 7 for use in the system is shown in detail in FIG. 2. A transistor 10, which may for example be of the PNP junction variety although other suitable types may be used, has a collector element 10*c*, a base 10*b* and an emitter 10*e*. The crystal 11 provides a frequency determining feedback path between collector and base of the transistor, and the output voltage at the pilot frequency is developed across the inductor 12. As will be explained in detail in connection with FIG. 4, the D.C. supply voltages for the system will be present at the inner conductor of the coaxial cable 3, the outer conductor of which is grounded. The D.C. voltage is coupled via resistors 13, 14 and coil 12 to the collector 10*c* of the transistor. Zener diode 15 is coupled between the junction of resistors 13 and 14 and ground and is operated continuously in its reverse breakdown region to stabilize the collector voltage regardless of variations in potential at the cable 3. Bias current to stabilize the transistor operating point is supplied to the base of 10*b* via resistor 16. Resistor 17 matches the oscillator output to the characteristic impedance of the coaxial cable and the capacitor 18 selected so that a predetermined magnitude of pilot frequency signal is applied to the cable. Elements 19, 20, 21 and 22 are D.C. blocking capacitors. The oscillator thus provides a signal having a frequency closely controlled by the crystal 11 at an amplitude well stabilized by virtue of the constant collector voltage provided by the Zener diode 15. This output is coupled to the transmission line 3 along with the received signal from the antenna 1.

Figure 3:
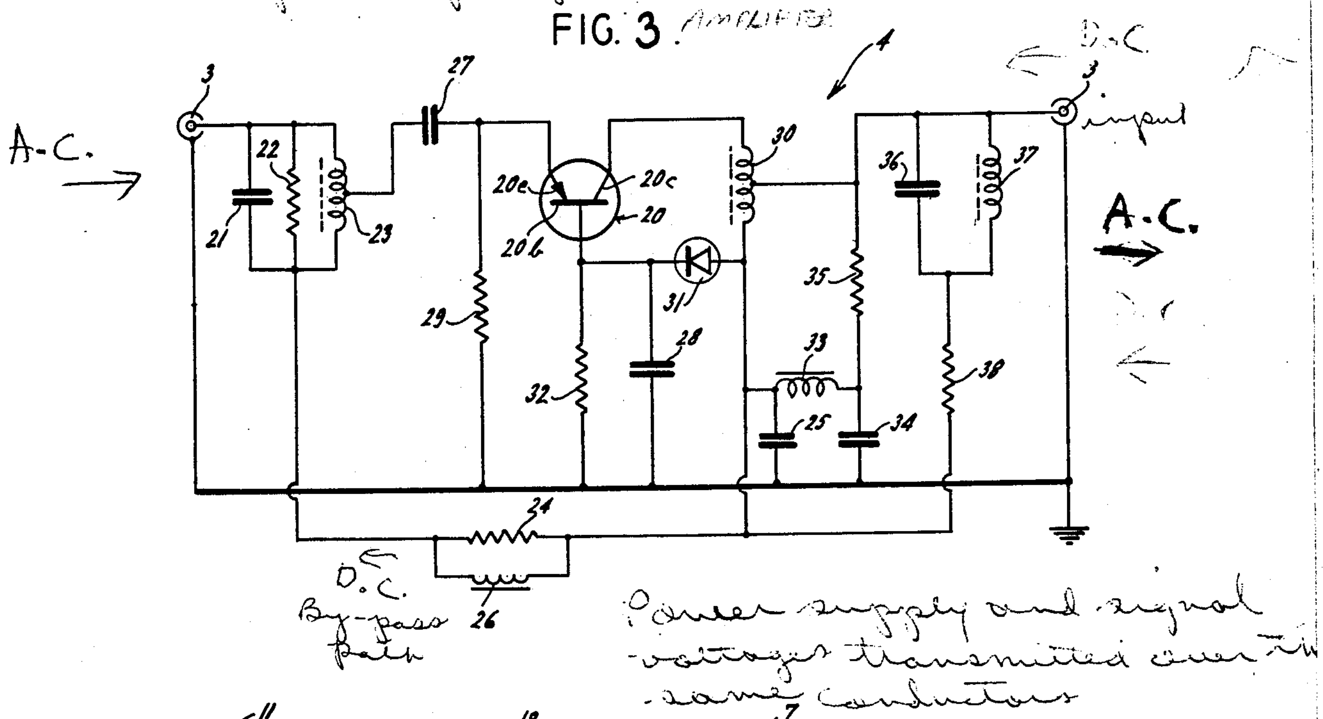
FIG. 3 is a schematic diagram of a preferred form of amplifier used in the system.

Referring now to FIG. 3, there is shown a preferred form of amplifier 4 for use in the system. As shown, it comprises a transistor 20 having emitter 20*e*, base 20*b*, and collector 20*c*. The transistor may conveniently be of the PNP junction type, although other types may be used as well. Input high frequency signals are applied from the coaxial cable 3 to an impedance matching network comprising capacitor 21, resistor 22, and ferrite core transformer 23 connected in parallel. The lower terminal of this network is connected via resistor 24 and bypass capacitor 25 to ground. The RF choke 26 provides a low impedance path for D.C. in parallel with the resistor 24.

The tap on the ferrite transformer 23 is connected through D.C. blocking capacitor 27 to the emitter 20*e* of the transistor. The outer conductor of the cable 3 is tied directly to ground, thereby applying the input signal between the emitter 20*e* and base 20*b* of the transistor via the bypass capacitor 28. The resistor 29 establishes the correct emitter operating potential.

The signal output at the collector 20*c* of the transistor 20 is coupled via ferrite core transformer 30 to the center conductor of the coaxial cable 3 at the output side of the amplifier. As will be discussed more fully hereinafter, suitable D.C. collector potential will also be available at center conductor of the cable 3 and is connected via inductor 30 to collector 20*c*. Between the lower terminal of the inductor 30 and the base 20*b* is connected Zener diode 31. Resistor 32 couples base 20*b* to ground. The D.C. voltage developed across the Zener diode and resistance 32, i.e., the D.C. voltage between the inner conductor of the coaxial cable and ground, is sufficient to maintain the diode conducting continuously in its reverse breakdown region, thereby providing a constant D.C. voltage drop across its terminals regardless of potential fluctuations at the cable. The Zener diode 31 thus serves to stabilize the collector-base voltage while the D.C. voltage drop across resistor 32, which varies in accordance with the changes at the cable, supplies the necessary emitter-base bias. If, for example, the D.C. voltage at the coaxial cable is increased, increased current will flow through the series-connected Zener diode 31 and resistor 32. This results in an increased voltage drop across resistor 32, the Zener voltage remaining constant, and the transistor 20 will be biased to operate in a region of high gain. Should the line voltage decrease, the transistor gain will decrease. In both cases, the collector-base bias will remain constant at the Zener voltage. The gain of the amplifier thus varies in accordance with the D.C. supply voltage.

Inductors 33, 37, capacitors 34, 36, and resistors 35, 38, at the output of the amplifier comprise a compensating network to provide a relatively flat gain vs. frequency characteristic over the entire range of frequencies with which the system is to be used. This is necessitated by the well known characteristic of coaxial cable in which attenuation increases with frequency. This compensating network is of course designed to suit the particular type of transmission line used in the system, and may be eliminated if desired.

The amplifier is bypassed for D.C. by means of the path consisting of inductor 37, resistor 38, inductor 26 and inductor 23. This permits D.C. potentials present at the center conductor of the cable 3 at the output end of the amplifier to be transferred to the cable at the input end of the amplifier from whence it may be available to the preceding amplifiers and the oscillator 7 of the system. It may thus be considered that signal energy flows from left to right through the amplifier while power supply energy flows from right to left.

D.C. By-Pass of amp.

Figure 4:
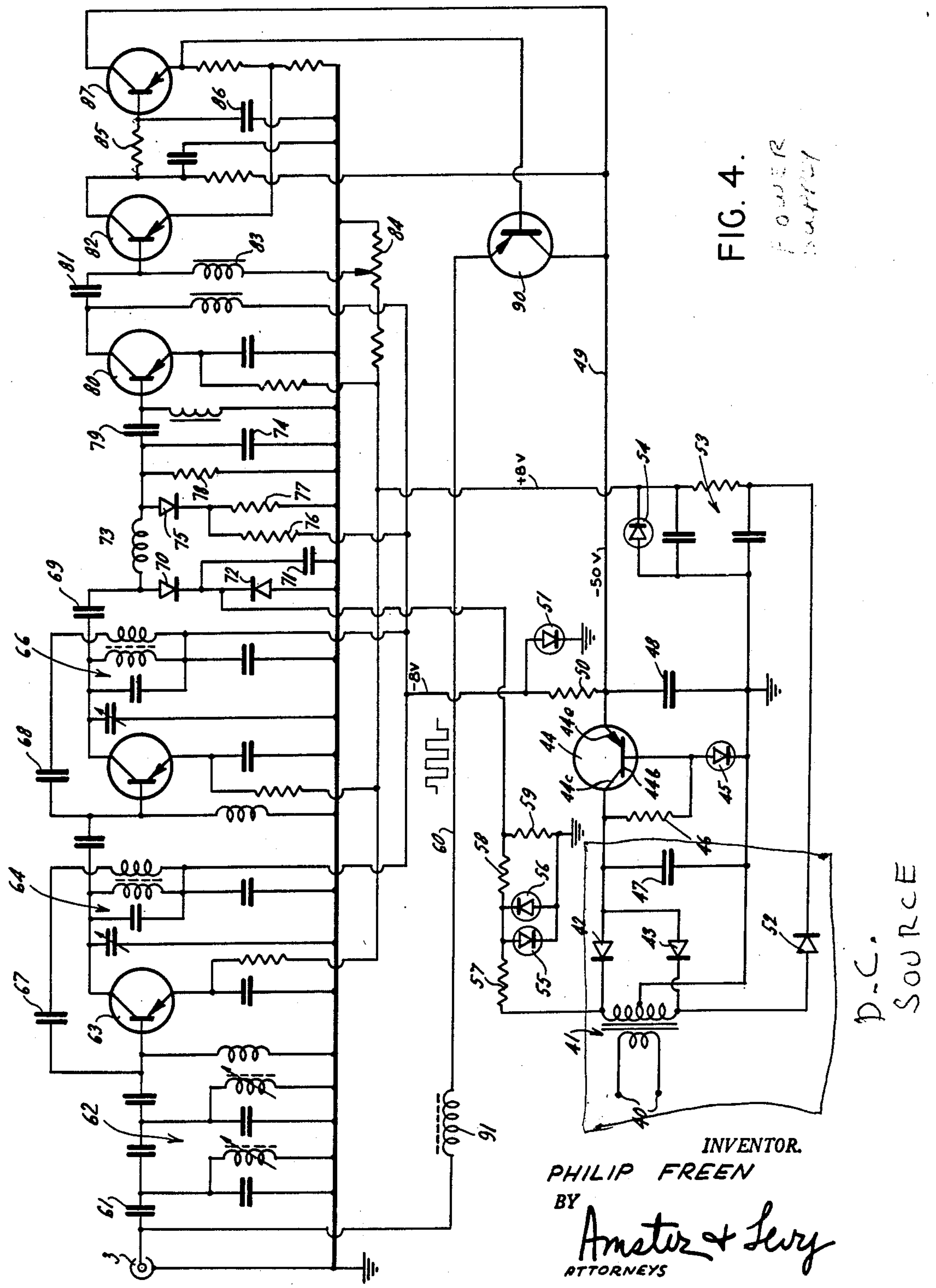
FIG. 4 is a schematic diagram of the power supply and control apparatus used in the system.

The power supply 5 of the system is illustrated in detail in FIG. 4. The upper half of the circuit constitutes the control section while the lower half is the power supply section. The latter section comprises a standard 117 volt, 60 cycle source of A.C. coupled to terminals 40 of the primary of the transformer 41. The secondary winding has a center tap connected to ground and the ends of the winding are coupled through diodes 42, 43 respectively and thence to a common point to form a conventional full wave rectifier. The D.C. output is applied directly to the collector 44c of the PNP transistor 44. The base 44b of the transistor is connected to ground through Zener diode 45. Resistor 46 is connected between the collector and base elements of the transistor 44. The Zener diode 45 is so poled and the output voltage of the full wave rectifier assembly of such a value, that the diode 45 is conducting continuously in its reverse breakdown region. This conduction path may be traced from ground, through the diode 45 and the resistor 46 to the rectifier terminal. The voltage drop across resistor 46 maintains transistor 44 conductive and therefore the emitter 44c will assume the voltage across the Zener diode less the negligible base-emitter drop of the transistor. Since the Zener voltage will remain constant regardless of fluctuations of the rectified supply, the effect is to provide a substantially constant D.C. potential level on the line 49. In one typical application, a 50 volt Zener diode was used and the line 49 was held at 50 volts negative with respect to ground. This provides sufficiently high collector potentials to accommodate all of the PNP type of transistors used in the system. The capacitors 47, 48 are smoothing capacitors.

The resistor 50 and Zener diode 51 provide means for generating another stable D.C. level for use in the circuit. In this case, the diode 51 is selected to have a smaller reverse breakdown voltage than diode 45, e.g. 8 volts, and thus its junction with resistor 50 provides a −8 volt level by virtue of the voltage divider action of the two elements.

A positive bias potential is developed by means of halfwave rectifier diode 52, ripple filter 53 and stabilizing Zener diode 54. This provides, in the example cited, a +8 volt level; The Zener diode 54 being selected to have an 8 volt Zener breakdown voltage.

The 60 cycle A.C. signal at the secondary of the transformer 41 is also coupled via resistor 57 to Zener diodes 55 and 56 connected in back-to-back fashion. These diodes are selected to have the same Zener breakdown voltage, e.g. 8 volts, and therefore will clip both positive and negative half cycles of the sinusoidal voltage to provide a square wave output of 16 volts peak-to-peak amplitude in the example cited. The resistors 58 and 59 comprise a voltage divider for deriving the desired amplitude of the square wave output at line 60. The circuit is thus a chopper whose use in the control circuit will become apparent hereinafter.

All of the signals present on the coaxial cable 3 are coupled through D.C. blocking capacitor 61 to the input of the control section of the circuit 5. The circuit elements indicated generally at 62 comprise a narrow band pass filter of well-known type tuned to the frequency of the pilot oscillator 7 used in the system. None of the signal frequencies received in the system will be passed by this filter. The filtered signal is applied to the input of transistor amplifier 63 whose output is passed through filter 64 to the input of a second amplifier 65 similar to the amplifier 63. The amplifier 65 has an output filter network 66 similar to network 64. The capacitors 67 and 68 are neutralizing capacitors for the respective amplifiers.

The amplified pilot signal frequency is applied through coupling capacitor 69 to the anode of diode 70 whose cathode is grounded for A.C. through capacitor 71. To the cathode of the diode 70 is also applied the square wave chopper output present on conductor 60. The diode 72 is connected between the cathode of diode 70 and ground and so polarized with respect to the chopper input as to bypass the negative going portion of the square wave to ground and apply the positive going portion of the square wave to the cathode of diode 70. The net effect is to render the diode 70 non-conducting only during the positive half cycles of the square wave chopper output. The A.C. output of the amplifier 65 is thus halfwave rectified by diode 70 and modulated at a 60 cycle rate by the chopper output. The rectified, modulated output is smoothed by choke 73 and capacitor 74, providing a modulated D.C. output. The diode 75 is a temperature compensating element to counteract the reverse leakage current that will tend to flow through diode 70 when it is reverse biased. This leakage current increases with temperature and if uncompensated would develop a voltage across resistor 78 and interfere with the sensitivity of the system. The diode 75 is biased to be always slightly conductive in the forward direction by means of the voltage divider formed by resistors 76 and 77. Thus, any reverse current through diode 70 will be shorted to ground.

The modulated D.C. signal is applied through coupling capacitor to the base of transistor 80, connected in a common emitter audio amplifier configuration. Its output is a 60 cycle sinusoidal wave whose amplitude is proportional to the amplitude of the modulated D.C. applied to its input. This output is connected via coupling capacitor 81 to the base of transistor amplifier 82.

Transistor amplifier 82 is biased through audio frequency choke 83 and potentiometer 84 so as to be nonconductive in the absence of an input signal of a predetermined magnitude. In the non-conducting state, the collector of transistor 82 remains at its supply potential level. In the presence of an A.C. signal having sufficient peak amplitude to overcome the bias, transistor 82 becomes conductive, raising the potential at its collector during each negative going peak of input voltage. These positive pulses at the collector are smoothed by resistor 85 and capacitor 86 to provide a D.C. input to the base of transistor 87. It will be apparent that the bias level determined by the setting of potentiometer 84 will control the conductivity of transistor 87, and thus its collector potential.

Transistors 87 and 90 form a pair of cascaded emitter followers. As is well known to those skilled in the art, this circuit configuration provides a high power output at a low impedance level and is thus capable of supplying a constant output voltage for varying loads. As shown in the drawing, the emitter output of transistor 87 is connected directly to the base of transistor 90. The emitter of the latter is connected through radio frequency choke 91 to the center conductor of cable 3 to place a D.C. voltage thereon. It will be apparent that a change in input level to emitter follower 87 will produce a corresponding voltage change at its emitter output. This is applied to the input of emitter follower 90 where again a corresponding change in voltage level is produced at the emitter output. The two emitter followers provide output voltage shifts corresponding to the input shifts but at a substantially increased power level.

Supply voltages for the various transistors of the circuit of FIG. 4 are provided by the stabilized power supply as shown; the lower power transistors 63, 65, 80 obtaining their collector potentials from the lower voltage output stabilized by Zener diode 51. The high power transistors 82, 87 and 90, on the other hand obtain suitable collector potentials from the line 49.

In operation, the pilot frequency from oscillator 7, after traversing the entire length of the cable 3 and the amplifiers 4 interposed therein, is filtered out at 62 and amplified in stages 63 and 65. These amplifiers are carefully controlled whereby all of the possible signal levels applied to the input will be amplified the same amount. The output of the amplifier therefore bears a fixed relationship to its input. This output is rectified at diode 70, but since high D.C. amplification is difficult to obtain without drift and stability problems, the rectified output is chopped at 60 cycles to provide an audio signal which may be more readily amplified.

This audio frequency signal is amplified at 80, this amplifier providing a fixed gain for its entire range of input signals. The 60 cycle sinusoidal signal at the output of amplifier 80 will be directly proportional in amplitude to the level of the pilot tone signal at the cable 3.

The output of amplifier 80 is applied to the input of threshold amplifier 82. A positive bias is applied to the base of the transistor via potentiometer 84 such that the transistor is rendered non-conductive in the absence of an alternating input signal. The bias level is so chosen that the transistor will conduct for the negative half cycles only, throughout the entire expected range of alternating current signals at the output of amplifier 80. The collector potential will go more positive as the amplitude of the input signals increase and more negative as the input decreases. These changes are smoothed by the resistor 85 and capacitor 86 and applied to the cascaded emitter followers 87, 90 where they are reproduced at a higher power level and applied to the cable 3.

At a level of pilot signal which will insure adequate reception to all subscribers, potentiometer 84 is adjusted so that the voltage supplied to the line by transistor 90 is of the proper value for the transistors of the amplifiers 4 and oscillator 7. Since all of these transistors are shown as being of the PNP type in the embodiment described, this voltage will be negative with respect to ground. Should the magnitude of the received pilot signal be below the normal level, the collector voltage of transistor 82 will become more negative, thereby increasing the negative voltage applied to the line. Referring to the description of the amplifier 4, it will be seen that this will have the effect of increasing its amplification, thus restoring adequate signal to the system. In the opposite situation, where attenuation in the system decreases, the circuit would obviously operate in the opposite sense, decreasing the supply voltage and thus reducing the gain of the amplifiers. The circuit of FIG. 4 thus provides a means for effecting automatic gain control of the entire distribution system.

As can be seen from the foregoing description, a signal distribution system has been provided wherein automatic means are provided for insuring that suitable signal levels are present through the system. Moreover, the system is so arranged that all of the power supply potentials are generated at a single location, thus eliminating the requirement that the individual amplifiers be provided with separate power supplies and be located near suitable energy sources. These factors, when combined with the simplicity and reliability of the circuitry used, provide a signal distribution system possessing overall operating characteristics superior to any heretofore attained.

It will be understood that various modifications may be made by those skilled in the art without departing from the spirit and scope of the invention.

What I claim is:

1. A system for distributing signal energy to a plurality of locations comprising, an input terminal, a control terminal, a signal transmitting medium connecting said terminals, a plurality of amplifier interposed in said transmitting medium, the gain of each of said amplifiers being variable with the power supply potentials applied thereto, means applying signal energy to be distributed to said input terminal, means for applying a constant amplitude control signal to said input terminal, both said signal energy and said control energy traversing said transmitting medium and said amplifiers to said control terminal, means at said control terminal for generating power supply potentials, means including said transmitting medium coupling said supply potentials to each of said amplifiers, and means responsive to the amplitude of said control signal at said control terminal for varying the magnitude of said supply potentials, whereby the gain of the entire system is maintained at least at a predetermined level.

2. A system for distributing radio frequency signals to a plurality of points comprising, an input terminal to which said signals are applied, a control terminal, a transmission line interconnecting said terminals, a plurality of amplifiers interposed in said transmission line, the gain of said amplifiers being variable in accordance with the power supply potentials applied thereto, a source of alternating current control signals of constant amplitude and predetermined frequency characteristic coupled to said input terminal, means at said control terminal for generating power supply potentials, circuit means responsive to the amplitude of said control signals at said control terminal to vary the amplitude of said power supply potentials, and means including a transmission line for coupling said potentials to each of said amplifiers to control the gain thereof, whereby an automatic gain control of the entire system is effected.

3. A signal distribution system according to claim 2 further comprising an antenna coupled to said input terminal to supply input signals thereto and a plurality of signal utilization means connected to said transmission line.

4. The signal distribution system of claim 2 wherein said transmission line is a coaxial cable.

5. The signal distribution system of claim 2 wherein each of said amplifiers comprises a transistor having emitter, base and collector electrodes, a pair of circuit elements connected between said means coupling said power supply potentials to said amplifier and reference potential, one of said elements providing a constant voltage drop for all values of current therethrough, the other of said elements providing a voltage drop proportional to the current therethrough, means connecting said one element in the collector-base circuit of said transistor and said other element in the base-emitter circuit, means for applying said radio frequency signals and said control signals from said transmission line to the base-emitter circuit of said transistor, and means connected to said collector to withdraw amplified versions of said signals.

6. The signal distribution system of claim 2 wherein said source of control signals comprises an oscillator including a transistor having emitter, base, and collector electrodes, a frequency determining crystal connected between said collector and base electrodes, means coupling said power supply potentials to said collector electrode, means connected between said collector and emitter electrodes to maintain a constant direct current potential therebetween regardless of variations of said power supply potentials, and an impedance connected between said collector and emitter electrodes across which the output of said oscillator is developed.

7. The signal distribution system of claim 2 wherein said means for generating power supply potentials includes a plurality of cascaded emitter follower stages and said circuit means comprises and amplifier responsive to said predetermined frequency characteristic of said control signal and means to vary the input voltage applied to the first of said emitter follower stages in accordance with the amplitude of said amplified control signal.

8. A system for distributing received radio frequency signals to a plurality of individual subscribers over an extended geographical area comprising, an antenna adapted to receive the range of frequencies desired, an input terminal, a control terminal, means coupling said antenna to said input terminal, a transmission line coupling said terminals, a control oscillator having a constant amplitude output at a fixed frequency within said range connected to said input terminal, means at said control terminal for generating unidirectional power supply potentials, means coupling said potentials to said transmission line, a pluralty of variable gain amplifiers interposed in said transmission line between said terminals, each of said amplifiers being connected to amplify the radio frequency signals on said line and to obtain power supply potentials therefrom, the gain of said amplifiers being dependent on the amplitude of said supply potentials, and means responsive to the amplitude of the output of said control oscillator at said control terminal to vary the amplitude of said supply potentials.

9. A signal distribution system comprising signal-input means adapted to receive radio frequency signals, a transmission network including a transmission line having an input end connected to said signal-input means and an output end, plural amplifiers connected in said transmission line, means for applying a constant amplitude control signal to said input end of said transmission line, a direct current power supply for said amplifiers connected to said output end of said transmission line, means responsive to the amplitude of said control signal after traversing said transmission line from said input end to said output end for varying the magnitude of said direct current power supply, each of said amplifiers including means for varying the gain thereof as a function of said direct current power supply, and means including said transmission line providing a direct current path from said direct current power supply to said plural amplifiers such that direct current power is applied to the gain varying means of each of said plural amplifiers.

10. A signal distribution system comprising signal-input means adapted to receive radio frequency signals, a transmission network including a transmission line having an input end connected to said signal-input means and an output end, plural amplifiers connected in said transmission line, and plural tap-offs at spaced locations along said line for utilization of the amplified radio frequency signals, means for applying a constant amplitude control sgnal to said input end of said transmission line, a direct current power supply for said amplifiers connected to said output end of said transmission line, means responsive to the amplitude of said control signal after traversing said transmission line from said input end to said output end for varying the magnitude of said direct current power supply, each of said amplifiers including means for varying the gain thereof as a function of said direct current power supply, and means including said transmission line providing a direct current path from said direct current power supply to said plural amplifiers such that direct current power is applied to the gain varying means of each of said plural amplifiers.

11. A system for distributing received radio frequency signals to a plurality of individual subscribers over an extended geographical area comprising, an antenna adapted to receive the range of frequencies desired, an input terminal, a control terminal, means coupling said antenna to said input terminal, a transmission line coupling said terminals, a control oscillator having a constant amplitude output at a fixed frequency within said range connected to said input terminal, means at said control terminal for providing a power supply source, means coupling said power supply source to said transmission line, a plurality of variable gain amplifiers interposed in said transmission line between said terminals, each of said amplifiers being connected to amplify the radio frequency signals on said line and to obtain power from said power supply source, the gain of said amplifiers being dependent on the amplitude of said supply potentials, and means responsive to the amplitude of the proportional output of said control oscillator appearing at said control terminal to vary the magnitude of said power.

12. A signal distribution system comprising signal-input means adapted to receive radio frequency signals, a transmission network including a transmission line having an input end connected to said signal-input means and an output end, plural amplifiers connected in said transmission line, means for applying a constant amplitude control signal to said input end of said transmission line, a power supply source for said amplifiers connected to said output end of said transmission line, means responsive to the amplitude of said control signal after traversing said transmission line from said input end to said output end for varying the magnitude of said power supply each of said amplifiers including means for varying the gain thereof as a function of said power supply, and means including said transmission line providing a power supply path from said supply source to said plural amplifiers such that said power supply source is applied to the gain varying means of each of said plural amplifiers.

References Cited in the file of this patent

UNITED STATES PATENTS

| | | |
|---|---|---|
| 2,477,028 | Wilkie | July 26, 1949 |
| 2,523,173 | Winters | Sept. 19, 1950 |
| 2,760,070 | Keonjian | Aug. 21, 1956 |
| 2,874,236 | Sikorra | Feb. 17, 1959 |
| 2,875,437 | George | Feb. 24, 1959 |
| 2,884,526 | Cortese | Apr. 28, 1959 |
| 2,926,308 | Thanos | Feb. 23, 1960 |
| 2,957,979 | Kammer | Oct. 25, 1960 |

FOREIGN PATENTS

| | | |
|---|---|---|
| 452,403 | Canada | Nov. 2, 1948 |